United States Patent
Waku et al.

(10) Patent No.: US 8,489,109 B2
(45) Date of Patent: Jul. 16, 2013

(54) PORTABLE WIRELESS DEVICE

(75) Inventors: Kenji Waku, Kanagawa (JP); Tadashi Koyama, Kanagawa (JP); Kunihiko Watanabe, Kanagawa (JP); Mitsuhiro Nishizono, Kanagawa (JP); Katsuji Morishita, Kanagawa (JP); Takeshi Iwanaga, Kanagawa (JP); Daisuke Togashi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 797 days.

(21) Appl. No.: 12/593,889

(22) PCT Filed: Mar. 28, 2008

(86) PCT No.: PCT/JP2008/056202
§ 371 (c)(1),
(2), (4) Date: Feb. 10, 2010

(87) PCT Pub. No.: WO2008/123456
PCT Pub. Date: Oct. 16, 2008

(65) Prior Publication Data
US 2010/0130140 A1  May 27, 2010

(30) Foreign Application Priority Data
Mar. 29, 2007  (JP) .................. 2007-087496

(51) Int. Cl.
*H04W 72/00*  (2009.01)
*H04B 1/04*  (2006.01)

(52) U.S. Cl.
USPC ........... 455/454; 455/123; 455/121; 455/125; 455/193.1; 455/193.2; 455/272; 455/290

(58) Field of Classification Search
USPC ........... 455/454, 123, 121, 125, 193.1, 193.2, 455/272, 290
See application file for complete search history.

(56) References Cited

U.S. PATENT DOCUMENTS 6,317,027 B1 * 11/2001 Watkins ................. 340/10.1
6,958,730 B2   10/2005 Nagumo et al.

(Continued)

FOREIGN PATENT DOCUMENTS

| JP | 2000-59121 | 2/2000 |
| JP | 2003-338768 | 11/2003 |
| JP | 2004-227046 | 8/2004 |
| JP | 2004-320520 | 11/2004 |

(Continued)

OTHER PUBLICATIONS

Office Action dated Nov. 7, 2011, in related U.S. Appl. No. 12/443,456.

*Primary Examiner* — Wen Huang
(74) *Attorney, Agent, or Firm* — Procopio, Cory, Hargreaves & Savitch LLP

(57) ABSTRACT

A mobile wireless device enables effective use of space in a case while reducing degradation of antenna gain and maintaining communication quality even if a plurality of antennas having different frequency bands are arranged close to one another. A magnetic antenna has a first switch unit, a second switch unit, and a concentrated constant circuit which are added to a wiring pattern at the side near to a main antenna, so that a first path and a second path can be selected. Under a predetermined condition, a CPU controls the first switch and the second switch to electrically connect terminal (A1) to terminal (B1) and electrically connect terminal (A2) to terminal (B2), thereby forming the first path; and electrically connect terminal (A1) to terminal (C1) and electrically connect terminal (A2) to terminal (C2), thereby forming the second path connected via the concentrated constant circuit.

11 Claims, 16 Drawing Sheets

U.S. PATENT DOCUMENTS

| | | | |
|---|---|---|---|
| 6,970,680 B1 * | 11/2005 | Tomoe | 455/63.3 |
| 2004/0113842 A1 | 6/2004 | du Toit et al. | |
| 2004/0121739 A1 * | 6/2004 | Suzuki et al. | 455/84 |
| 2004/0135729 A1 | 7/2004 | Talvitie et al. | |
| 2006/0118625 A1 * | 6/2006 | Sekita | 235/451 |
| 2009/0215385 A1 * | 8/2009 | Waters et al. | 455/1 |

FOREIGN PATENT DOCUMENTS

| | | |
|---|---|---|
| JP | 2005-142930 | 6/2005 |
| JP | 2006-504308 | 2/2006 |
| JP | 2006-304039 | 11/2006 |
| JP | 2007-43410 | 2/2007 |

\* cited by examiner (BEFORE STARTING COMMUNICATION)

(COMMUNICATION IN PROCESS)

READER/WRITER

READER/WRITER

FORCE (ACCELERATION)

MOVING DIRECTION

PORTABLE WIRELESS DEVICE

RELATED APPLICATION

This application is the United States national stage application of international application serial number PCT/JP2008/056202, filed 28 Mar. 2008, which claims priority to Japanese patent application no. 2007-087496, filed 29 Mar. 2007, each of which is incorporated herein by reference in its entirety.

FIELD OF THE INVENTION

The present invention relates to a portable wireless device for communicating with other terminals.

BACKGROUND

Recently, for improved functionality, portable wireless devices provided with a communicating means built into a body thereof, for communication by means of RFID (Radio Frequency Identification), which is a contactless IC (Integrated Circuit) chip, and the like, are becoming common (for example, see Patent Document 1).

In addition, as shown in Japanese Publication No. 2004-227046, although portable wireless devices are generally provided with a retractable main antenna outside a body thereof, for communicating with a mobile communication network, portable wireless devices with a main antenna built into a body thereof, for a more sophisticated design, are becoming common recently.

Although the main antenna for communication and an antenna such as an RFID use different usable frequency bands, the antennas are disposed as far as possible from each other in order to suppress interference effects of the antennas with each other. This makes efficient use of space inside the body difficult.

SUMMARY

The present invention has been made in view of the above mentioned problems, and one of the objectives thereof is to provide a portable wireless device that allows for effective use of space inside the body, while maintaining the communication quality, by suppressing the effects of interference among the antennas even when a plurality of antennas having different frequency bands are disposed adjacently.

In order to solve the above problems, the portable wireless device according to the first aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which, when a reception strength of the first usable frequency band by the first antenna unit is no more than a predetermined value, adjusts by the adjustment unit the resonance point of the first usable frequency band so that a high-order secondary resonance point of the first usable frequency band does not overlap with the second usable frequency band.

In order to solve the above problems, the portable wireless device according to the second aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which judges whether or not there is a demand for the predetermined processing by the first information processing unit of the first communication unit, and when it has judged that there is no such demand, adjusts by the adjustment unit the resonance point of the first usable frequency band so that the high-order secondary resonance point of the first usable frequency band does not overlap with the second usable frequency band.

In order to solve the above problems, the portable wireless device according to the third aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which, when a reception strength of the second usable frequency band by the second antenna unit is at least a predetermined value, adjusts by the adjustment unit the resonance point of the first usable frequency band so that the high-order secondary resonance point of the first usable frequency band does not overlap with the second usable frequency band.

In order to solve the above problems, the portable wireless device according to the fourth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which judges whether or not there is a demand for the predetermined processing by the second information processing unit of the second communication unit, and when it has judged that there is such a demand, adjusts by the adjustment unit the resonance point of the first usable frequency band so that the high-order secondary resonance point of the first usable frequency band does not overlap with the second usable frequency band.

In order to solve the above problems, the portable wireless device according to the fifth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, the second antenna unit being disposed at a position to an extent that interference with the first antenna unit would arise, and a second information processing unit that performs predetermined processing with respect to information communicated by the second antenna unit; an adjustment unit which adjusts a resonance point of the first usable frequency band of the first antenna unit; and a control unit which, when a reception strength of the first usable frequency band by the first antenna unit is no more than a predetermined value, adjusts by the adjustment unit the resonance point of the first usable frequency band so that the high-order secondary resonance point of the first usable frequency band does not overlap with the second usable frequency band.

In order to solve the above problems, the portable wireless device according to the sixth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, the second antenna unit being disposed at a position to an extent that interference with the first antenna unit would arise, and a second information processing unit that performs predetermined processing with respect to information communicated by the second antenna unit; an adjustment unit which adjusts a resonance point of the first usable frequency band of the first antenna unit; and a control unit which judges whether or not there is a demand for the predetermined processing by the first information processing unit of the first communication unit, and when it has judged that there is no such demand, adjusts by the adjustment unit the resonance point of the first usable frequency band so that the high-order secondary resonance point of the first usable frequency band does not overlap with the second usable frequency band.

In order to solve the above problems, the portable wireless device according to the seventh aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; a light intensity detection unit which detects light intensity outside of the body; and a control unit which, when a detected value of the light intensity by the light intensity detection unit is higher than a predetermined value, adjusts the resonance point of the first usable frequency band by the adjustment unit.

In order to solve the above problems, the portable wireless device according to the eighth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; an acceleration sensor, which is built into the body, and which detects acceleration of the body; and a control unit which, when a detected value by the acceleration sensor is at least a predetermined value, adjusts the resonance point of the first usable frequency band by the adjustment unit.

In order to solve the above problems, the portable wireless device according to the ninth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; an open/closed detection unit which detects whether the body is in an open state or a closed state; and a control unit which, when an open state is detected by the open/closed detection unit, adjusts by the adjustment unit the resonance point of the first usable frequency band so that the high-order secondary resonance point of the first usable frequency band does not overlap with the second usable frequency band.

In order to solve the above problems, the portable wireless device according to the tenth aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which, when a reception strength of the second usable frequency band by the second antenna unit is no more than a predetermined value, adjusts by the adjustment unit the resonance point of the first usable frequency band so that the high-order secondary resonance point of the first usable frequency band does not overlap with the second usable frequency band.

In order to solve the above problems, the portable wireless device according to the eleventh aspect of the present invention is characterized by including: a body; a first communication unit arranged in the body and including a first antenna unit that communicates with an external device by way of a first usable frequency band, and a first information processing unit that performs predetermined processing with respect to information communicated by the first antenna unit; a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit; an adjustment unit which adjusts a resonance point of the first usable frequency band of the first antenna unit; and a control unit which, when the second antenna unit is carrying out a reception operation with an external device, adjusts by the adjustment unit the resonance point of the first usable frequency band so that the high-order secondary resonance point of the first usable frequency band does not overlap with the second usable frequency band.

According to the portable wireless device of the twelfth aspect, it is preferable for the adjustment unit to adjust the resonance point of the first antenna unit within a range of the first usable frequency band.

According to the portable wireless device of the thirteenth aspect, it is preferable for the control unit to suppress an adjustment until after the elapse of a predetermined time from the start of the adjustment of the resonance point of the first usable frequency band by the adjustment unit. Effects of the Invention According to the present invention, it is possible to effectively use the space inside the body while maintaining the communication quality by suppressing the effects of interference among antennas, even if a plurality of antennas having different frequency bands are disposed adjacently in the body.

Figure 1:
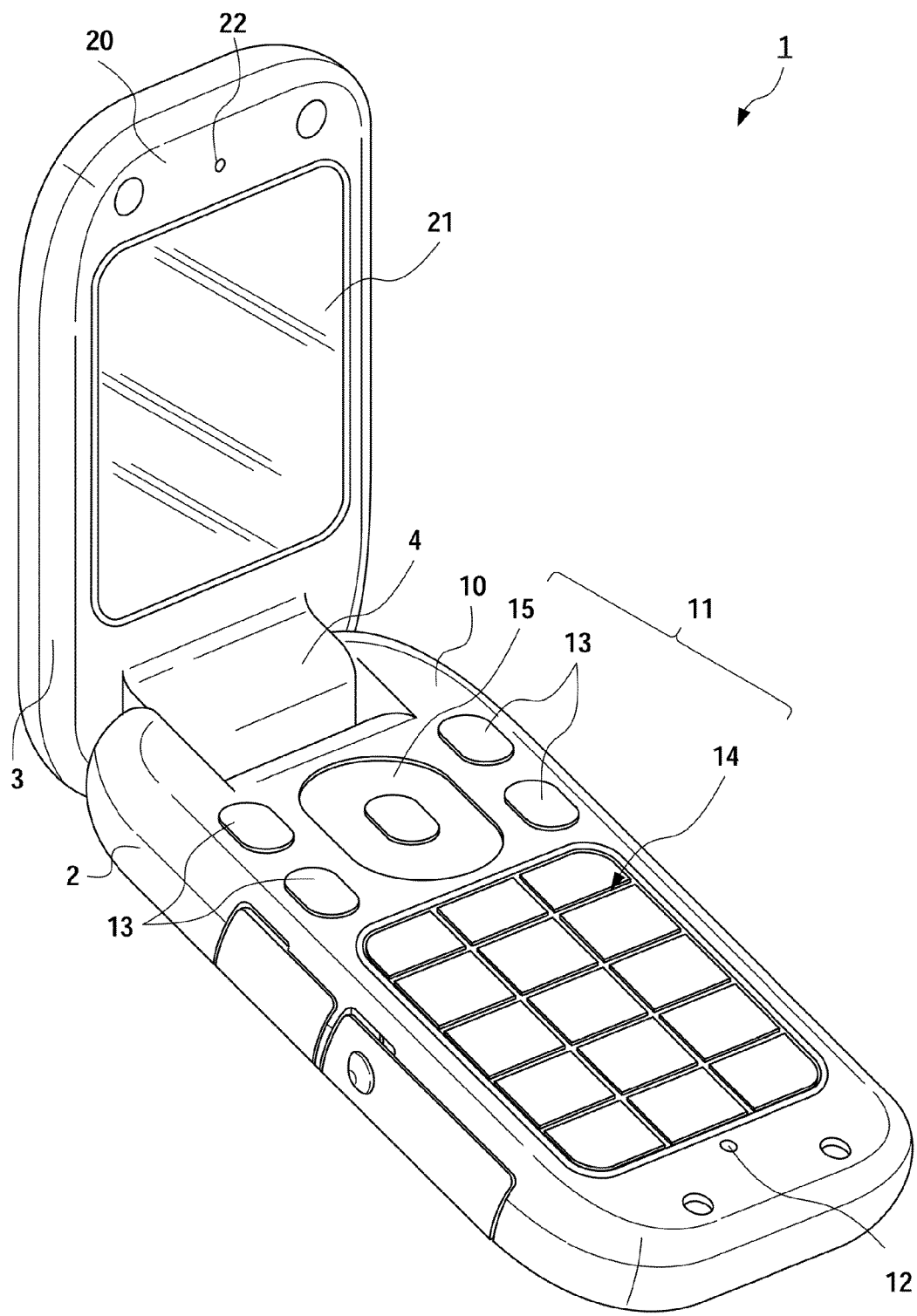
FIG. 1 is a perspective view showing an appearance of a cellular telephone device according to the present invention.

EXPLANATION OF THE REFERENCE NUMERALS 1 cellular telephone device
2 operation unit side body 3 display unit side body
4 hinge mechanism
40 substrate
41 RFID portion
42 rear case portion
50 magnetic field antenna
51 RFID chip
52 capacitor
70 main antenna
80 first switch portion
81 second switch portion
82 lumped constant circuit

DETAILED DESCRIPTION

A description is provided hereinafter regarding an embodiment of the present invention. FIG. 1 is a perspective view showing an appearance of a cellular telephone device 1 as an example of the portable wireless device according to the present invention. It should be noted that, although FIG. 1 shows a so-called folder-type cellular telephone device, the present invention is not limited thereto.

The cellular telephone device 1 is configured to include an operation unit side body 2 and a display unit side body 3. The operation unit side body 2 is configured to include, on a front face 10 thereof, an operation button set 11 and a sound input unit 12 to which sounds, which a user of the cellular telephone device 1 produces during a phone call, are input. The operation button set 11 includes: feature setting operation buttons 13 for operating various settings and various features such as a telephone number directory feature and a mail feature; input operation buttons 14 for inputting digits of a telephone number and characters for mail; and a selection operation button 15 that performs selection of the various operations and scrolling.

The display unit side body 3 is configured to include, on a front face portion 20, a display 21 for displaying various information, and a sound output unit 22 for outputting sound of the other party of a conversation.

In addition, the abovementioned operation button set 11, the sound input unit 12, the display 21, and the sound output unit 22 compose a processing unit 62 to be described later.

Furthermore, an upper end portion of the operation unit side body 2 and a lower end portion of the display unit side body 3 are connected via a hinge mechanism 4. Moreover, the cellular telephone device 1 can be made into a state in which the operation unit side body 2 and the display unit side body 3 are opening each other (opened state), and into a state in which the operation unit side body 2 and the display unit side body 3 are closing each other (closed state), as the operation unit side body 2 and the display unit side body 3, connected via the hinge mechanism 4, pivot with respect to each other.

Figure 2:
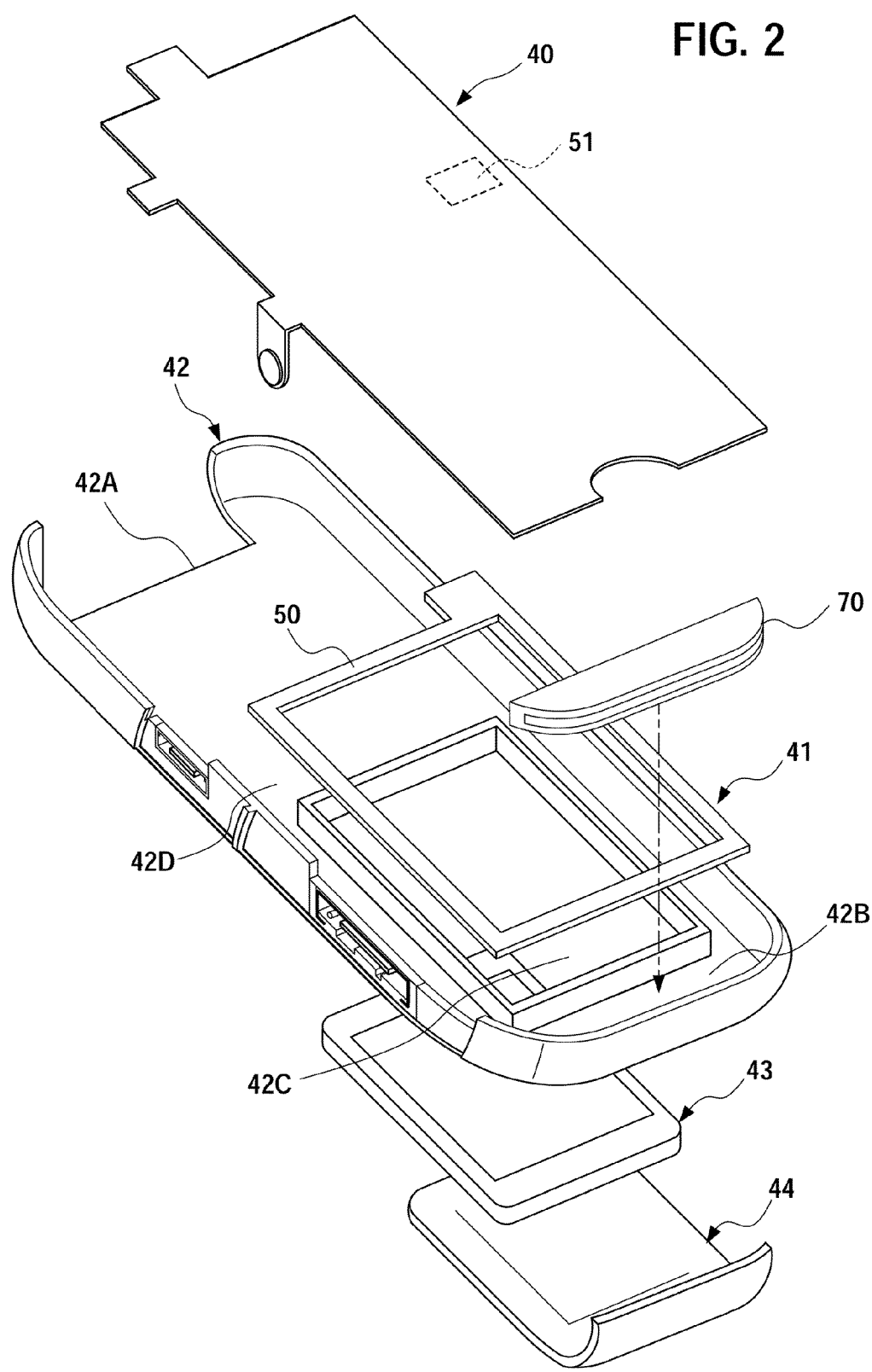
FIG. 2 is a perspective view showing a configuration of an operation unit side body included in the cellular telephone device according to the present invention.

FIG. 2 is an exploded perspective view of a part of the operation unit side body 2. The operation unit side body 2 is composed of a substrate 40, an RFID portion 41, a rear case portion 42, a rechargeable battery 43, and a battery cover 44, as shown in FIG. 2.

On the substrate 40, a device such as a CPU for performing predetermined arithmetic processing is mounted, and a predetermined signal is transmitted thereto when a user operates the operation button set 11.

The RFID portion 41 includes a magnetic field antenna 50 (a first antenna unit) for communicating with external devices by way of a first usable frequency band, and an RFID chip 51 (a first information processing unit) that performs predetermined processing with respect to information communicated by the magnetic field antenna 50. It should be noted that the RFID chip 51 is disposed on the substrate 40 facing the RFID portion 41 as shown in FIG. 2. Moreover, the RFID portion 41 is later described in detail.

The rear case portion 42 includes: a hinge mechanism fixing portion 42A for fixing the hinge mechanism 4; a main antenna housing portion 42B for housing a main antenna 70 (a second antenna unit), which communicates using a second usable frequency band that is higher than the first usable frequency band; a battery housing portion 42C for housing the rechargeable battery 43; and an RFID portion fixing portion 42D for fixing the RFID portion 41. It should be noted that the main antenna 70 is described later in detail.

Figure 3:
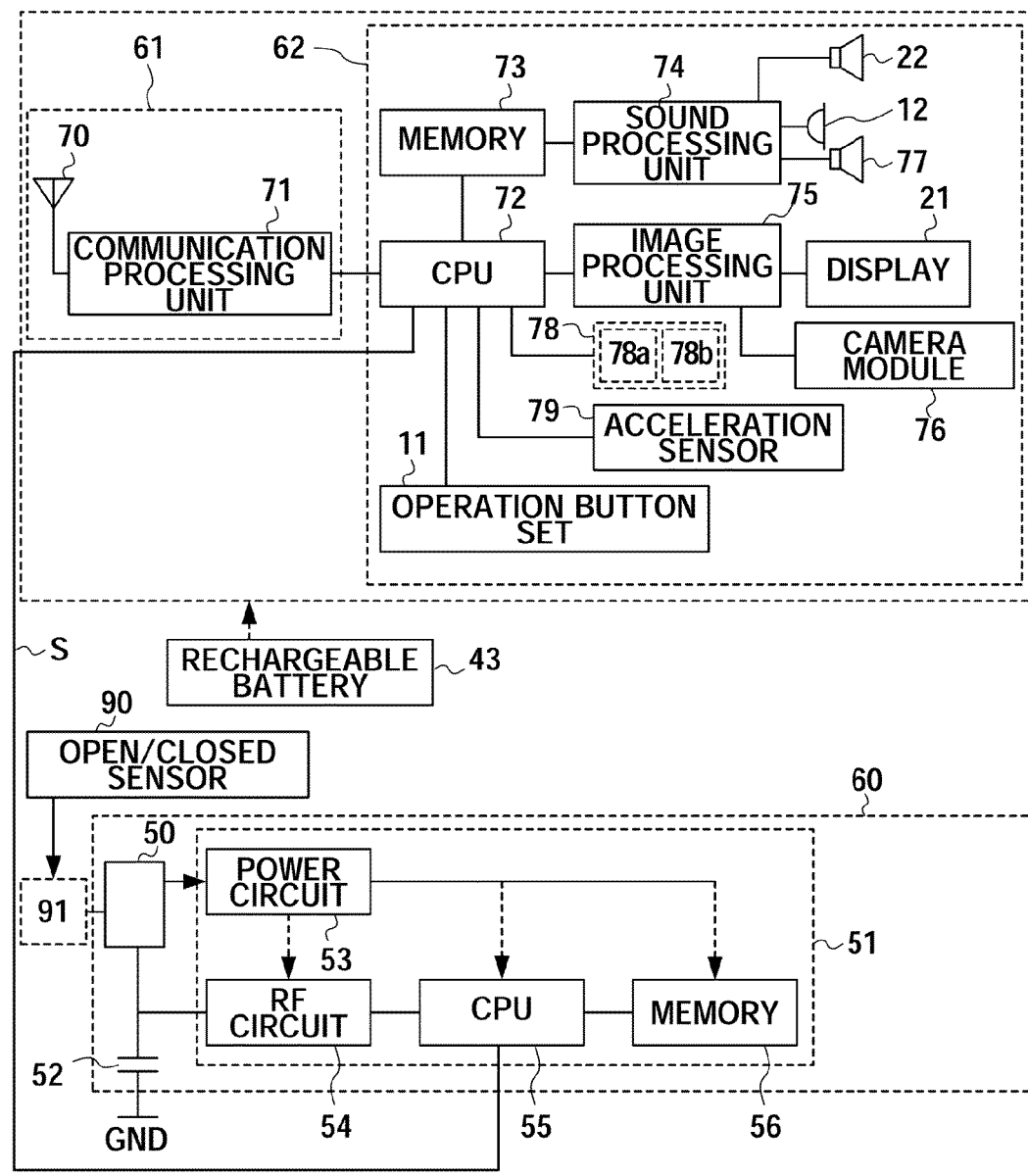
FIG. 3 is a block diagram showing features of the cellular telephone device according to the present invention.

FIG. 3 is a functional block diagram showing features of the cellular telephone device 1. As shown in FIG. 3, the cellular telephone device 1 includes: a first communication unit 60 that is configured with the RFID portion 41; a second communication unit 61 that communicates with external terminals; and a processing unit 62 that processes information communicated by the second communication unit 61.

The first communication unit 60 is composed of the RFID portion 41 and includes the magnetic field antenna 50 that communicates with external devices by way of the first usable frequency band (for example, 13.56 MHz), the RFID chip 51, and a capacitor 52 for adjustment.

The magnetic field antenna 50 includes a coil wound in a multiple spiral shape on a sheet made of PET (polyethylene terephthalate) material, and receives a signal of the first usable frequency band transmitted from external devices.

The RFID chip 51 includes: a power circuit 53 that generates a predetermined voltage based on electrical power induced by a signal received by the magnetic field antenna 50; an RF circuit 54 that performs signal processing such as modulation processing or demodulation processing with respect to a signal communicated by the magnetic field antenna 50; a CPU 55 that performs predetermined arithmetic processing; and memory 56 that stores predetermined data. The power circuit 53 is composed of a DC-DC converter, for example.

Here, behavior of the first communication unit 60 is described. The magnetic field antenna 50, when approaching to within a predetermined distance to a reading/writing device disposed outside thereof, receives radio waves transmitted from the reading/writing device (modulated by a carrier frequency having the first usable frequency band (for example, 13.56 MHz)). It should be noted that, a predetermined adjustment (tuning) is made to the capacitor 52 so that the radio waves of the first usable frequency band are transmitted to the RF circuit 54 via the magnetic field antenna 50.

In addition, electromotive force is generated by an electromagnetic induction effect when the electromagnetic waves are received by the magnetic field antenna 50.

The power circuit 53 generates a predetermined power supply voltage from the electromotive force generated by the electromagnetic induction effect, and supplies the power supply voltage to the RF circuit 54, the CPU 55, and the memory 56. In addition, the RF circuit 54, the CPU 55, and the memory 56 are switched from a halt state to an active state when the predetermined power supply voltage is supplied from the power circuit 53.

The RF circuit 54 performs signal processing such as demodulation with respect to a signal of the first usable frequency band received via the magnetic field antenna 50, and transmits the processed signal to the CPU 55.

The CPU 55 writes or reads data to or from the memory 56, based on the signal received from the RF circuit 54. In a case of reading data from the memory 56, the CPU 55 transmits the data to the RF circuit 54. The RF circuit 54 performs signal processing such as modulation with respect to the data being read from the memory 56, and transmits the data to the external reading/writing device via the magnetic field antenna 50.

Furthermore, although the first communication unit 60 is described above to be of a so-called passive, induction field type (electromagnetic induction type) without a power source, the present invention is not limited thereto, and the first communication unit 60 can also be of a passive mutual induction type (electromagnetic coupling type) or a passive radiation field type (radio wave type), or an active type with a power source. In addition, an access method of the first communication unit 60 is described as a read/write type; however, the present invention is not limited thereto, and the access method can also be of a read-only type, a write-once type, and the like.

Moreover, as shown in FIG. 3, the second communication unit 61 includes: a main antenna 70 that communicates with external devices by way of the second usable frequency band that is higher than the first usable frequency band; and a communication processing unit 71 (a second information processing unit) that performs signal processing such as modulation processing or demodulation processing. In addition, the second communication unit 61 is powered by the rechargeable battery 43.

The main antenna 70 communicates with external devices by way of the second usable frequency band (for example, 800 MHz). It should be noted that, although 800 MHz is set as the second usable frequency band in the present embodiment, other frequency bands can also be used. In addition, the main antenna 70 can be configured as a so-called dual band compatible antenna that can accept, in addition to the second usable frequency band, a third usable frequency band (for example, 2 GHz), or as a multi-band compatible antenna that can further accept a fourth usable frequency band.

The communication processing unit 71 performs demodulation processing of a signal received by the main antenna 70 to transmit the processed signal to the processing unit 62, or performs modulation processing of a signal received from the processing unit 62 to transmit the processed signal to an external device via the main antenna 70.

As shown in FIG. 3, the processing unit 62 includes: the operation button set 11; the sound input unit 12; the display 21; the sound output unit 22; a CPU 72 that performs predetermined arithmetic processing; memory 73 that stores predetermined data; a sound processing unit 74 that performs predetermined sound processing; an image processing unit 75 that performs predetermined image processing; a camera module 76 that captures an image of an object; and a speaker 77 that outputs ringtones and the like. In addition, the processing unit 62 is powered by the rechargeable battery 43. It should be noted that, as shown in FIG. 3, the cellular telephone device 1 is configured such that: the CPU 55 and the CPU 72 are connected by a signal line S via which information processed by the first communication unit 60 is transmitted to the image processing unit 75; and information processed by the image processing unit 75 is displayed on the display 21.

Figure 4:
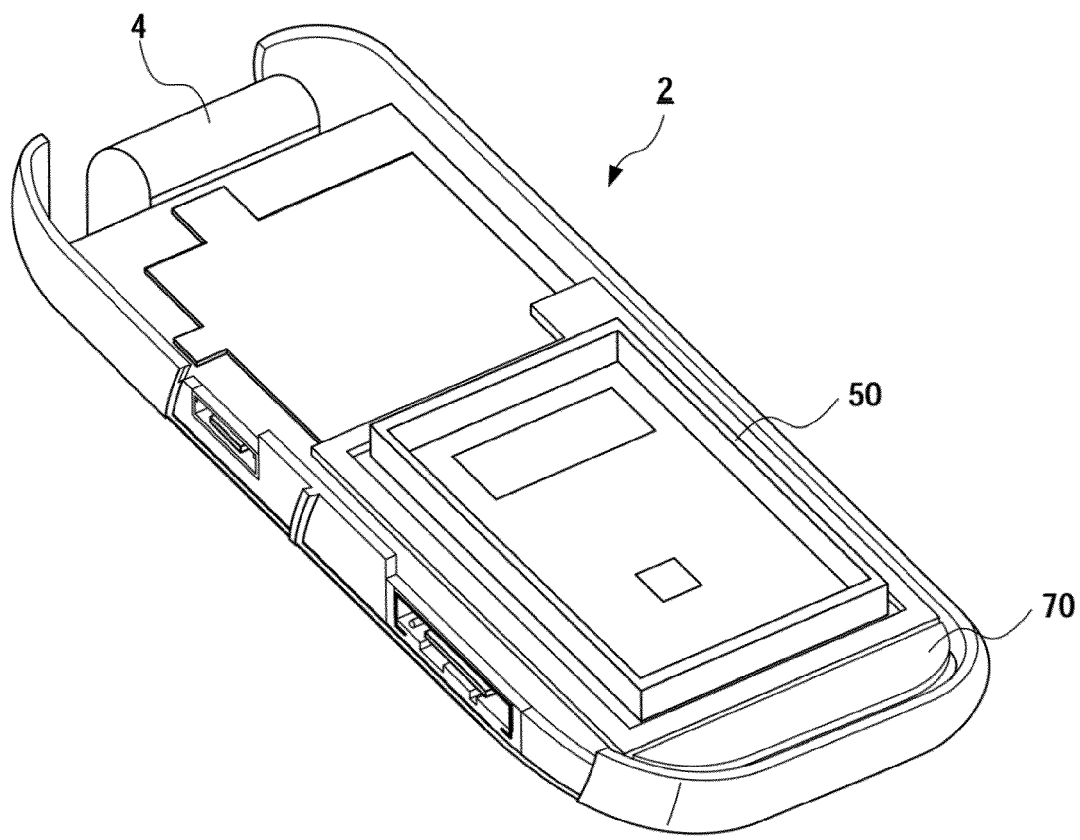
FIG. 4 is a perspective view showing a positional relationship between a magnetic field antenna and a main antenna provided in the cellular telephone device according to the present invention.

In addition, FIG. 4 is a diagram showing a positional relationship between the magnetic field antenna 50 of the RFID portion 41 and the main antenna 70. It should be noted that the rear case portion 42 is omitted in FIG. 4.

As shown in FIG. 4, the magnetic field antenna 50 and the main antenna 70 are in the vicinity of each other (several millimeters). In a case in which the two antennas are disposed in the vicinity of each other in this manner, problems occur due to interference between the magnetic field antenna 50 and the main antenna 70.

More specifically, the magnetic field antenna 50 has low-order and high-order secondary resonance points in cycles, other than the usable frequency band (13.56 MHz). In particular, when the high-order secondary resonance point (hereinafter referred to as high-order resonance point) overlaps the usable frequency band (800 MHz or the like) of the main antenna 70, the gain of the main antenna 70 is degraded (to be described later in detail with reference to FIG. 8).

Given this, the cellular telephone device 1 according to the present embodiment adopts a configuration such that the frequency components of the high-order resonance points of the magnetic field antenna 50 can be shifted as necessary, in order to prevent gain degradation of the main antenna 70 by the high-order resonance points of the magnetic field antenna 50.

Figure 5:
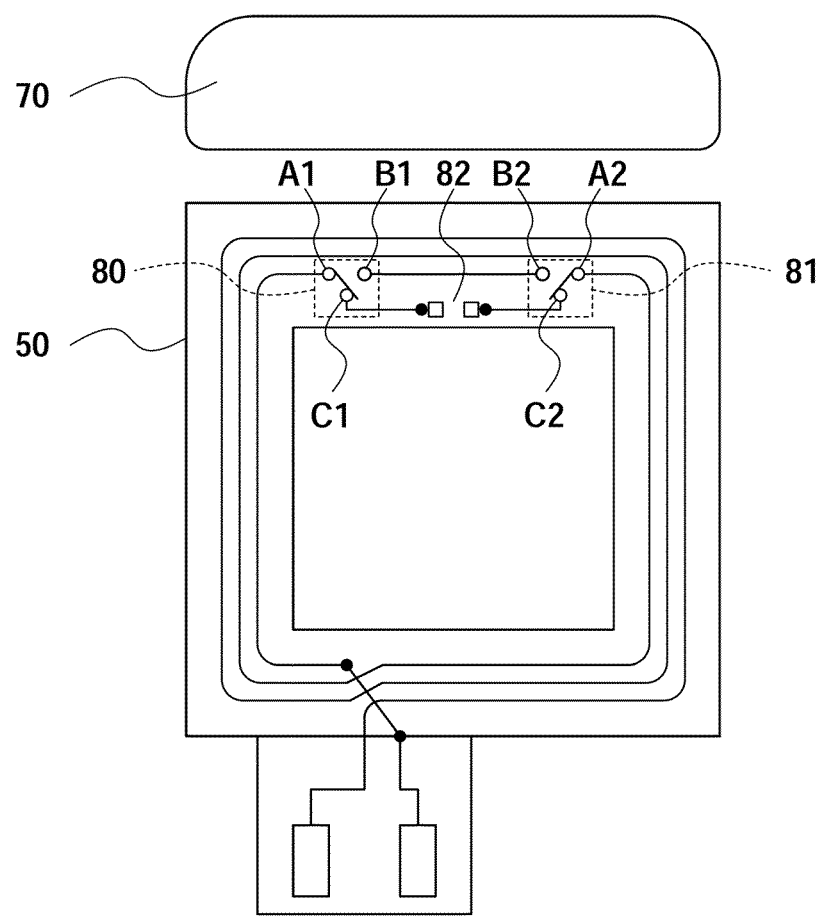
FIG. 5 is a diagram showing a first configuration of the magnetic field antenna provided in the cellular telephone device according to the present invention.

Specifically, as shown in FIG. 5, the cellular telephone device 1 is configured such that, in order to adjust the frequency characteristics of the main antenna 70, under predefined conditions the inductance value of the magnetic field antenna 50 is appropriately changeable by switching to change the connection pathway of the antenna pattern of the magnetic field antenna 50.

The magnetic field antenna 50 is configured such that a first pathway or a second pathway are selectable, by adding to the wiring pattern at the side near the main antenna 70, a first switching unit 80, a second switching unit 81, and a lumped constant circuit 82 (adjustment unit).

The first switching unit 80 is configured of a terminal A1, a terminal B1, and a terminal C1; and the second switching unit 81 is configured of a terminal A2, a terminal B2, and a terminal C2.

The lumped constant circuit 82 is configured, for example, of a phase rotating element such as a coil or a parallel resonant circuit, and one end side is connected to the terminal C1 of the first switching unit 80, and the other end side is connected to the terminal C2 of the second switching unit 81. It should be noted that, in the present embodiment, a lumped constant circuit is added, however, provided that it can change the inductance value, it may also be another configurational element, for example it may be configured by adding a ferrite or the like.

The CPU 72 (control unit) controls the first switching unit 80 and the second switching unit 81 under predefined conditions, and configures a first pathway by connecting the terminal A1 and the terminal B1, and further connecting the terminal A2 and the terminal B2, or on the other hand configures a second pathway connected by way of the lumped constant circuit by connecting the terminal A1 and the terminal C1, and connecting the terminal A2 and the terminal C2.

Herein, the first pathway is the pathway with the best communication quality and the best communication power efficiency in the first communication unit 60. However, in this case, the high-order resonance points of the magnetic field antenna 50 overlap with the usable frequency band of the main antenna 70. Further, the second pathway is a pathway via the lumped constant circuit 82, and is configured such that in this state, the inductance value of the magnetic field antenna 50 is changed, and the high-order resonance points of the magnetic field antenna 50 do not overlap with the usable frequency band of the main antenna 70. Accordingly, when the second pathway is selected, gain degradation of the main antenna 70 by the high-order resonance points of the magnetic field antenna 50 can be avoided. Moreover, even when the second path is selected, the magnetic field antenna 50 has a resonance point within the range of the usable frequency band of the magnetic field antenna 50, and it can carry out communication with an external device in the first usable frequency band.

It should be noted that, in FIG. 5 it is shown that the second pathway configured of the first switching unit 80, the second switching unit 81, and the lumped constant circuit 82, is attached only to one part of the line configuring the magnetic field antenna 50, but without being limited to this, it may be configured such that the second pathway is attached to all of the line.

Herein, the features of the first communication unit 60 will be explained. The first communication unit 60 has a card feature which carries out the operation of receiving a signal transmitted from the side of an external device (for example, a R/W (reader/writer device)), and an R/W (reader/writer) feature which carries out transmission to the outside of data stored in a memory 56 which is spontaneously read out, and carries out communication with an external device (such as a card having a receiving feature or the like). It should be noted that, the card feature is a feature which is passively exercised in communication with a reader/writer device provided, for example, in a ticket gate of a train station, while the R/W feature is a feature which is actively exercised in communication with, for example, a card incorporating an IC.

<Use of the Card Feature>

If the CPU 72 judges that the level (reception strength) of the signal transmitted from the reader/writer device is no more than a predefined level (predetermined value), it judges that the first communication unit 60 is not being used, and switching control of the first switching unit 80 and the second switching unit 81 is carried out so as to select the second pathway. When the second pathway is selected, the inductance value of the magnetic field antenna 50 is changed, and therefore excellent communication can be carried out by the main antenna 70 without the high-order resonance points of the magnetic field antenna 50 exerting an effect on the usable frequency band of the main antenna 70.

It should be noted that, even when the second pathway is selected, the resonance frequency of the magnetic field antenna 50 is designed so as to not fall outside of the usable bandwidth (specification), therefore it is possible to carry out communication with a reader/writer device.

It should be noted that, when the CPU 72 judges that the level (reception strength) of the signal (carrier) transmitted from the reader/writer device is higher than a predefined level (predetermined value), it is judged to use the first communication unit 60, and switching control of the first switching unit 80 and the second switching unit 81 is carried out so as to select the first pathway. When the first pathway is selected, it is possible to carry out excellent communication between the magnetic field antenna 50 and the reader/writer device.

Even when the first pathway is selected, it is possible to carry out communication by the main antenna 70.

Therefore, in the cellular telephone device 1 of the present embodiment, when communication is carried out with a reader/writer device according to control by the CPU 72, namely, when the level of the signal transmitted by the reader/writer device is higher than a predefined level, the first pathway is selected, and at other times, namely when the level of the signal transmitted by the reader/writer device is below a predefined level, the second pathway is selected. Accordingly, in the cellular telephone device 1 according to the present embodiment, when the first pathway is selected, excellent communication can be carried out between the magnetic field antenna 50 and the reader/writer device, and further, when the second pathway is selected, the high-order resonance points of the magnetic field antenna 50 exert no effect on the usable frequency bandwidth of the main antenna 70, and excellent communication can be carried out by the main antenna 70.

<Use as a R/W Device>

The CPU 72 carries out switching control of the first switching unit 80 and the second switching unit 81 so as to select the second pathway when the first communication unit 60 is not used. Then, when the second pathway is selected, the inductance value of the magnetic field antenna 50 is changed and therefore, the high-order resonance points of the magnetic field antenna 50 will not exert an effect on the usable frequency band of the main antenna 70, and excellent communication can be carried out by the main antenna 70.

Further, even in the case that the second pathway is selected, the resonance frequency of the magnetic field antenna 50 is designed so as to not fall outside of the usable bandwidth (specs), therefore it is possible to carry out communication with a reader/writer device.

Further, the CPU 72 carries out switching of the first switching unit 80 and the second switching unit 81 so as to select the first pathway depending on the timing of transmitting data to the card side by an operation by the user or the activation of a predetermined program, in other words, depending on the timing of a demand when judging the presence or absence of a demand of predetermined processing to the RFID chip 51. When the first pathway is selected, the resonance frequency with the optimal communication power efficiency is selected, thus is it possible to carry out excellent communication between the magnetic field antenna 50 and the card. It should be noted that, even when the first pathway is selected, is it possible to communicate using the main antenna 70.

Therefore, in the cellular telephone device 1 of the present embodiment, when communication with the card is carried out by the control of the CPU 72, namely, only when a demand of a predetermined processing is made to the RFID chip 51 by an operation by the user or the activation of a predetermined program, the first pathway is selected, and at other times the second pathway is selected. Accordingly, in the cellular telephone device 1 of the present embodiment, when the first pathway is selected, excellent communication can be carried out between the magnetic field antenna 50 and the card, and when the second pathway is selected, the high-order resonance points of the magnetic field antenna 50 do not exert an effect on the usable frequency band of the main antenna 70, and excellent communication can be carried out by the main antenna 70.

Figure 6:
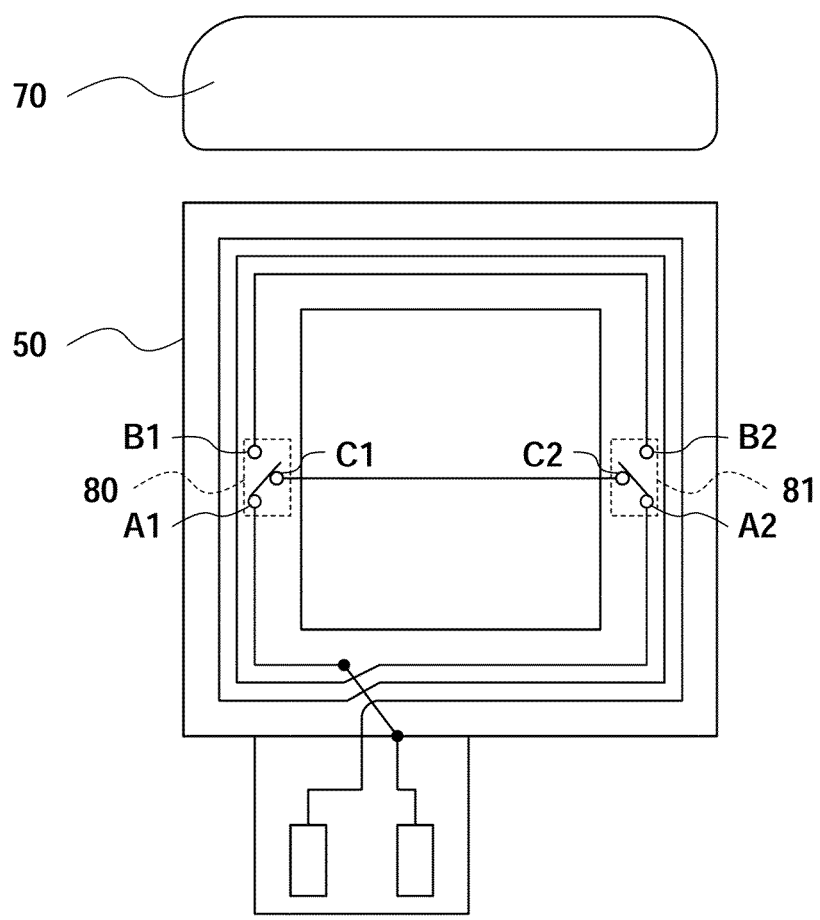
FIG. 6 is a diagram showing the second configuration of the magnetic field antenna provided in the cellular telephone device according to the present invention.

Further, the cellular telephone device 1, besides the above described configuration (FIG. 5), may also be configured for example, as shown in FIG. 6, such that the first switching unit 80 and the second switching unit 81 are each provided at predetermined positions of the wire configuring the magnetic field antenna 50, and under predefined conditions, the first switching unit 80 and the second switching unit 81 are controlled by the CPU 72, to configure the first pathway by connecting the terminal A1 and terminal B1, and further connecting the terminal A2 and terminal B2, or on the other hand, to configure the second pathway by connecting the terminal A1 and terminal C1, and further connecting the terminal A2 and terminal C2, and the element length (inductance value) of the magnetic field antenna 50 differs for the case of the first pathway and the case of the second pathway.

According to such a configuration, when the first pathway is selected, it is possible to carry out excellent communication by the magnetic field antenna 50, and further, when the second pathway is selected, it is possible to carry out excellent communication by the main antenna 70, without the high-order resonance points of the magnetic field antenna 50 exerting any effect on the usable frequency band of the main antenna 70.

Figure 7:
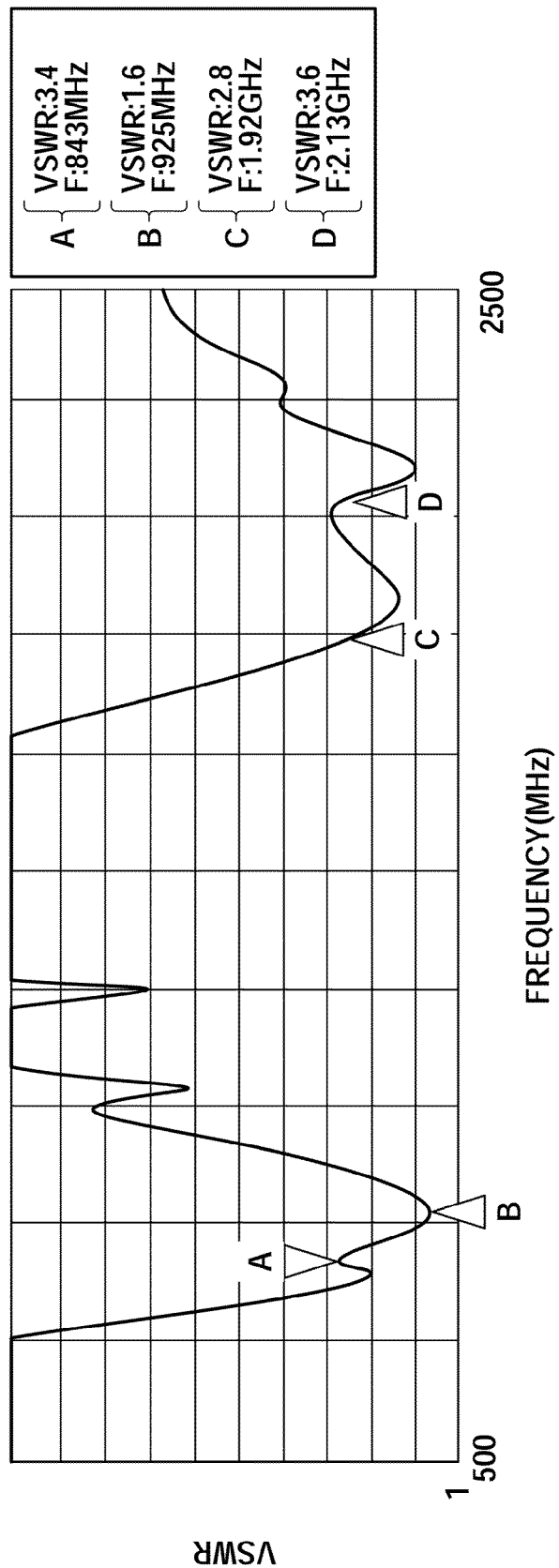
FIG. 7 is a diagram showing a result of measuring VSWR in a case where a band limiting element is attached to the magnetic field antenna.
Figure 8:
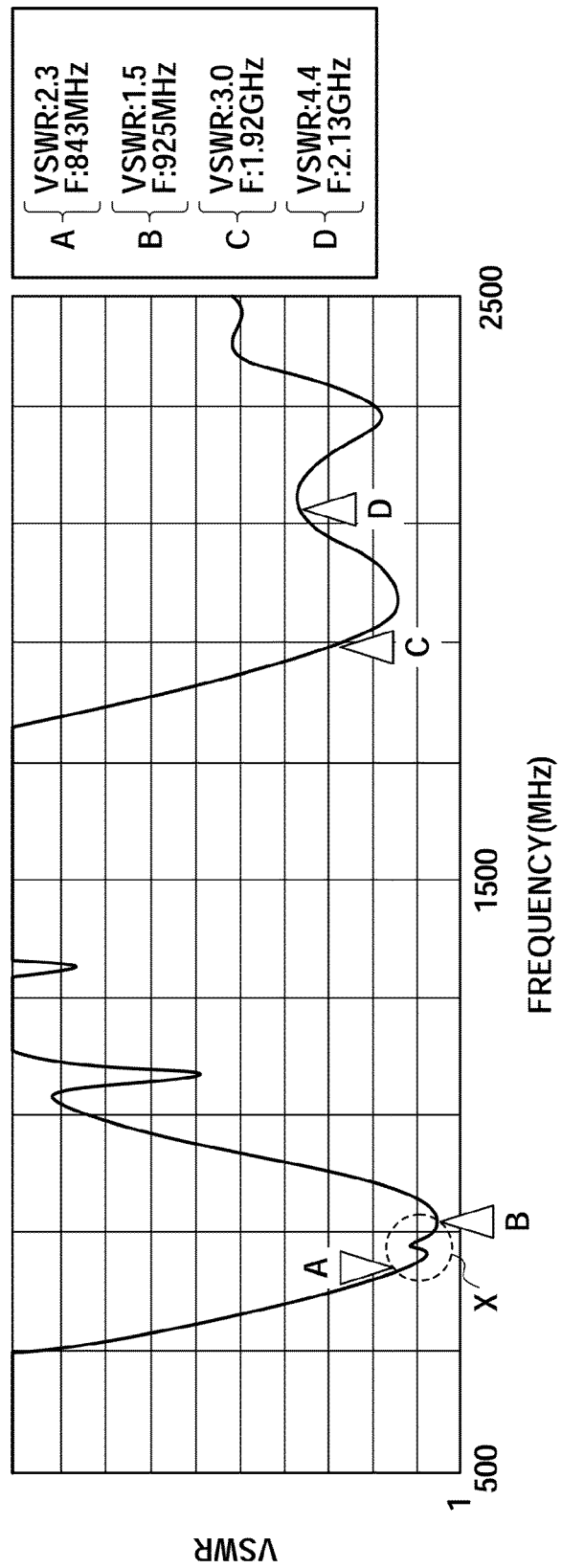
FIG. 8 is a diagram showing a result of measuring VSWR in a case where a band limiting element is not attached to the magnetic field antenna.

Further, FIG. 7 shows the results of the measurement of the VSWR (Voltage Standing Wave Ratio) of the frequencies from 500 MHz to 2.5 GHz, when the second pathway is selected in the cellular telephone device 1 of the present embodiment, and FIG. 8 shows the results of the measurement of the VSWR of the frequencies from 500 MHz to 2.5 GHz, for a cellular telephone of the prior art. Moreover, the measurements were carried out with a measuring device (network analyzer) connected to the feeding point of the main antenna 70 of the cellular telephone device 1. Further, the measurements were carried out using cellular telephone devices having a bandwidth of the usable frequency band of 843 MHz to 925 MHz (point A to point B in FIG. 7 and FIGS. 8), and 1.92 GHz to 2.18 GHz (point C to point D in FIG. 7 and FIG. 8).

As can be understood from FIG. 7 and FIG. 8, in the configuration of the prior art (FIG. 8), the effect of the high-order resonance points of the magnetic field antenna 50 from 843 MHz to 925 MHz (point A to point B in FIG. 8) is manifested (X in FIG. 8), while the effect of the high-order resonance points of the magnetic field antenna 50 from 843 MHz to 925 MHz (point A to point B in FIG. 7) is eliminated (shifted to the low frequency side).

Therefore, according to the cellular telephone device 1 of the present embodiment, when the second pathway is selected, because the inductance value is changed, the high-order resonance points of the magnetic field antenna 50 exert no effect on the usable frequency band of the main antenna 70, and excellent communication can be carried out by the main antenna 70, and further, when the first pathway is selected, in the same way as for the prior art, it is possible to carry out excellent communication by the magnetic field antenna 50 with no degradation of the performance, with by way of a resonance frequency having optimal communication power efficiency. Further, according to the present embodiment, even when the magnetic field antenna 50 and the main antenna 70 are adjacently disposed, because the degradation of the gain of the main antenna 70 is reduced by the CPU 72 controlling the resonance point of the magnetic field antenna 50, the design sense can be emphasized while maintaining the communication quality, the space inside the body can be effectively utilized, and further it is possible to realize a size reduction of the body itself. Further, in the present embodiment, because of the use as an adjustment unit of the high-order resonance points of the magnetic field antenna 50, of a first switching unit 80, a second switching unit 81, and a lumped constant circuit 82 integrated with the magnetic field antenna 50 as a wiring pattern of the magnetic field antenna 50, it is unnecessary to dispose a separate member as an adjustment unit inside the body, therefore the space inside the body can be effectively utilized and it is possible to realize a size reduction of the body itself.

It should be noted that the above described embodiment assumes the case of interference arising from the adjacent disposition of the main antenna 70 and the magnetic field antenna 50, but the present invention is effective for the case of the effects of the high-order resonance points of the magnetic field antenna 50 influencing the usable frequency band of another antenna, regardless of the positional relationship of the two antennas.

Further, in the above described embodiment, an RFID is shown as a configurational element for carrying out communication with an external device by way of a first usable frequency band, but without being limited to this, it could be another configurational element which may give rise to interference with the usable frequency band of the main antenna 70.

For example, according to the present embodiment, the first pathway and the second pathway were switched in accordance with the level of the signal transmitted from a reader/writer device, but because it can be assumed that generally the time of communication by the magnetic field antenna 50 will be shorter than the time of communication by the main antenna 70, it may be configured such that after a predetermined time has elapsed from the start of adjusting to the first pathway, switching to the second pathway occurs. It should be noted that this configuration may be applied to all of the below described embodiments.

Other Embodiment 1

Figure 9:
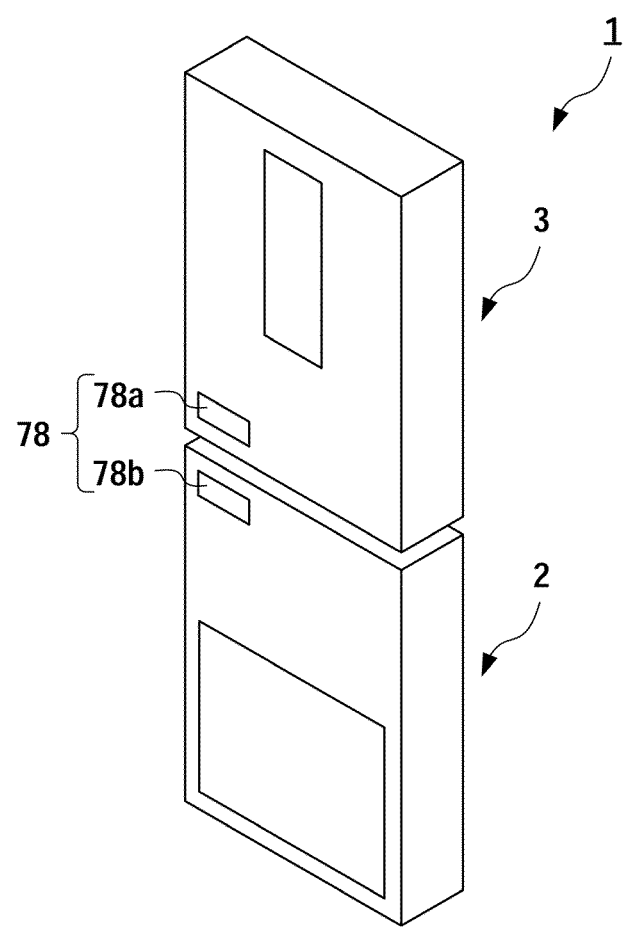
FIG. 9 is a diagram showing the appearance of the rear face of the cellular telephone device of the present invention.

Next, another first embodiment of the cellular telephone device 1 will be explained. As shown in FIG. 3, the cellular telephone device 1 is provided with a luminance sensor 78 (light intensity detection unit). It should be noted that as shown in FIG. 9, in the present embodiment, a first luminance sensor 78a is disposed at the surface of the rear face side of the display unit side body 3, and a second luminance sensor 78b is disposed at the surface of the rear face side of the operating unit side body 2. It should be noted that in the explanation below, in the normal state of use, it is designed such that the high-order resonance points of the magnetic field antenna 50 exert no effect on the usable frequency band of the main antenna 70 (in the case of the configuration according to FIG. 5 and FIG. 6, the second pathway is selected).

Herein, the luminance sensor 78 will now be explained. The luminance sensor 78 is a sensor which senses ambient brightness. For example, by utilizing the luminance sensor 78, a cellular telephone device 1 can have features such that the brightness of the display 21 can be adjusted to a degree which the user feels to be appropriate, and further, in a place which the user feels to be dark, a light source can be illuminated, and conversely, it can be illuminated if it is felt to the bright.

Further, the luminance sensor 78 can be one configured of a phototransistor, one configured of a photodiode, or one configured of a photodiode with an amplifier circuit added thereto. Any one of the above configurations, within a scope which does not deviate from the intent of the present embodiment, can be applied as the luminance sensor 78 of the present embodiment.

Further, in the present embodiment, the detection value by the luminance sensor 78 is used as a motive (trigger) by the lumped constant circuit 82 for whether or not to shift the high-order resonance points of the magnetic field antenna 50 from the usable frequency band of the main antenna 70.

Specifically, when the detected value by the luminance sensor 78 is at or below a predetermined value (namely, when it is dark), the CPU 72 does not carry out adjustment of the resonance point of the first usable frequency band (for example, 13.56 MHz) by the lumped constant circuit 82 (adjustment unit). Further, when the detected value by the luminance sensor 78 is higher than a predetermined value (namely, it is bright), the CPU 72 adjusts, by the lumped constant circuit 82, the resonance point of the first usable frequency band such that the high-order secondary resonance point of the of the first usable frequency band does not overlap with the second usable frequency band (for example 800 MHz) of the main antenna 70.

More specifically, in the closed state of the cellular telephone device 1, when the detected value of the light intensity by the first luminance sensor 78a is at or below a predetermined value, and after the lapse of a predefined time the detected value of the light intensity by the second luminance sensor 78*b* is at or below a predetermined value, the CPU 72 does not carry out adjustment of the resonance point of the first usable frequency band by the lumped constant circuit 82.

Figure 10A:
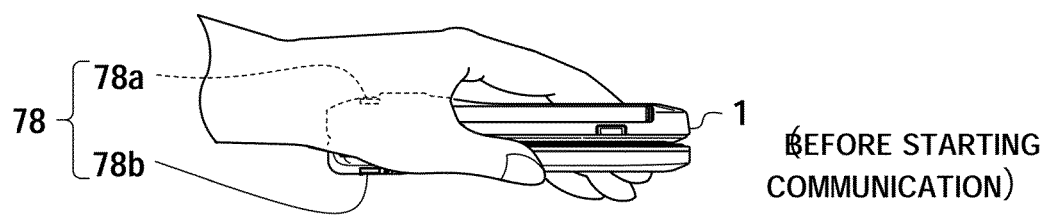
FIG. 10A is a diagram providing an explanation of the operation when the cellular telephone device is brought close to a reader/writer device.
Figure 10B:
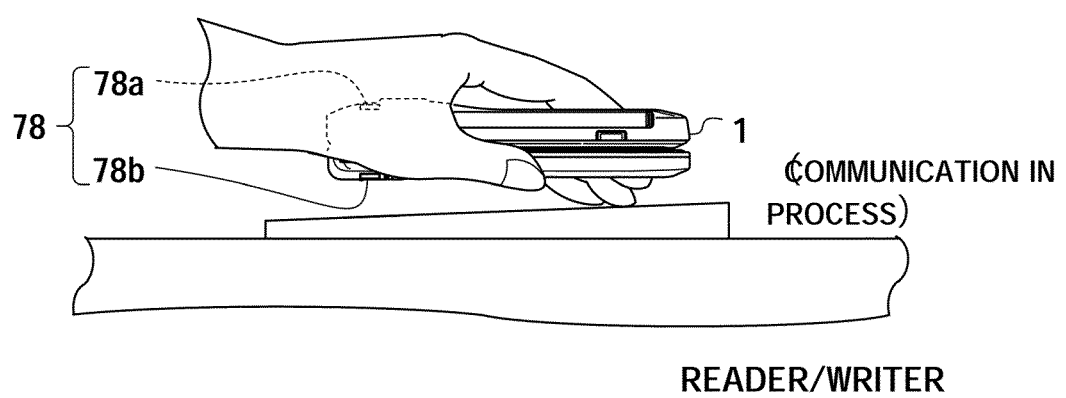
FIG. 10B is a diagram providing an explanation of the operation when the cellular telephone device is brought close to a reader/writer device.

By this behavior, in the present embodiment, the CPU 72 can presume a state wherein a user holds in his or her hand the cellular telephone device 1 in a closed state (at this time, as shown in FIG. 10A, the first luminance sensor 78*a* is obscured by the user's hand), and it approaches within a predetermined distance of an externally disposed reader/writer device (at this time, as shown in FIG. 10B, the second luminance sensor 78*b* is obscured by the reader/writer device). Accordingly, by not carrying out an adjustment of the first usable frequency band in a state wherein the magnetic field antenna 50 is utilized (in the case of the configuration of FIG. 5 and FIG. 6, the first pathway is not selected), the magnetic field antenna 50 can perform ideal communication.

Further, because the time for carrying out communication with an external reader/writer device by the magnetic field antenna 50 is usually short (for example, 3 seconds), by carrying out the adjustment of the resonance point of the first usable frequency band (the second pathway is selected in the case of the configuration of FIG. 5 and FIG. 6), with said communication tie as a timeout condition, under ordinary use conditions, if it is arranged such that adjustment is carried out by the lumped constant circuit 82, it is possible to prevent an effect by the high-order resonance points of the magnetic field antenna 50 from being exerted on the main antenna 70.

Other Embodiment 2

Further, as shown in FIG. 3, the cellular telephone device 1 is provided with an acceleration sensor 79. The acceleration sensor 79 will now be explained. The acceleration sensor 79 detects acceleration applied to the cellular telephone device 1, and outputs the detection results to the CPU 72. In the following explanation, it is designed such that the high-order resonance points of the magnetic field antenna 50 do not exert an effect on the usable frequency band of the main antenna 70 (the second pathway is selected in the case of the configuration of FIG. 5 and FIG. 6).

The acceleration sensor 79 is, for example, a triaxial (three dimensional) type which detects acceleration in the directions of the X axis, Y axis, and the z axis, and when an external force (F) is applied to the cellular telephone device 1, it measures an acceleration (a) based on the mass (m) of the cellular telephone device 1 (acceleration (a)=force (F)/mass (m)).

Further, the acceleration sensor 79, for example, measures the force applied to the cellular telephone device 1 with a piezoelectric element and determines the acceleration for each axis, converts it to numerical data, and buffers it. Then, the CPU 72 periodically reads out the buffered acceleration data. It should be noted that, the acceleration sensor 79 is not limited to a piezoelectric element (piezoelectric type), and can also be configured of an MEMS (Micro Electro Mechanical Systems) type such as a piezoresistive type, capacitive type, thermal detection type, or a servo type where a movable coil is moved, and returned to its place by a feedback current, or a strain gauge type which measures strain arising from acceleration by a strain gauge. Any one of the above described configurations, within a scope which does not deviate from the intent of the present embodiment, can be applied as the acceleration sensor 79 of the present embodiment.

Further, in the present embodiment, the detection value by the acceleration sensor 79 is used as a motive (trigger) by the lumped constant circuit 82 for whether or not to shift the high-order resonance points of the magnetic field antenna 50 from the usable frequency band of the main antenna 70.

Figure 11:
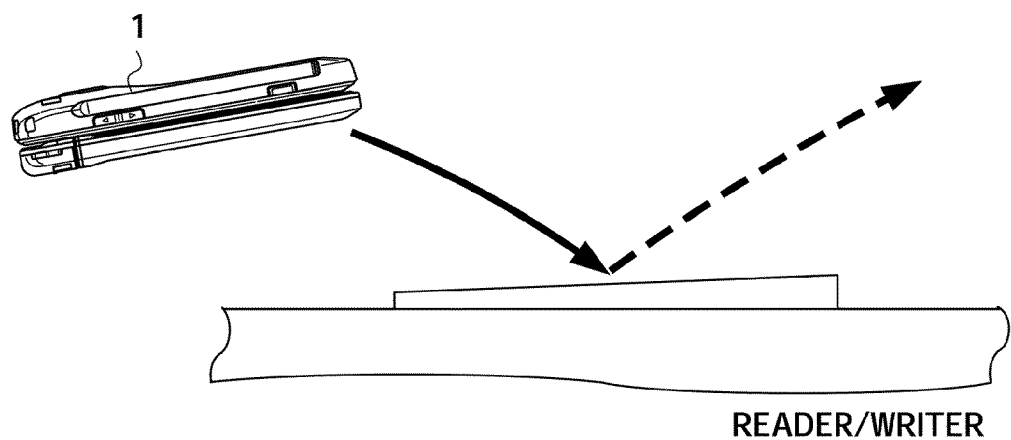
FIG. 11 is a diagram providing an explanation of the operation when the cellular telephone device is brought close to a reader/writer device.
Figure 12:
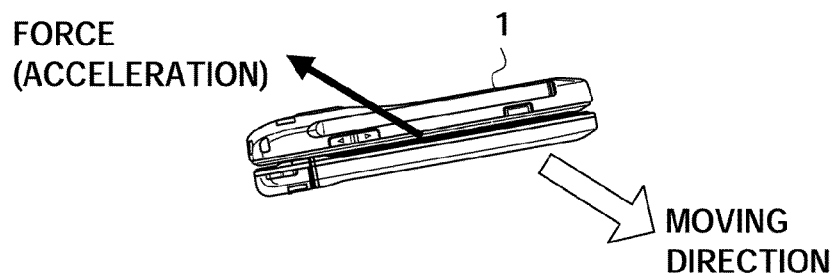
FIG. 12 is a diagram schematically showing the state of acceleration of the cellular telephone device in the operating state shown in FIG. 11.

Herein, when carrying out communication with a reader/writer device using the magnetic field antenna 50, a motion to bring the cellular telephone device 1 near the reader/writer device is made (refer to FIG. 11). The acceleration sensor 79 senses a position change in the state of the cellular telephone device 1 arising from this movement, and provides the detected value to the CPU 72. The CPU 72, based on this detected value, makes this a motive (trigger) for whether or not to shift, by the lumped constant circuit, the high-order resonance points of the magnetic field antenna 50 from the usable frequency band of the main antenna 70. It should be noted that, because the movement to bring the cellular telephone device 1 close to a reader/writer device (refer to FIG. 12) differs from a generally used movement, the CPU 72 can know the timing of the use of the magnetic field antenna 50 based on the detected value provided by the acceleration sensor 79.

For example, when the detected value provided by the acceleration sensor 79 is at or above a predetermined value, it is assumed that the user is holding the cellular telephone 1 in his or her hand, in a state such that it has approached within a predetermined distance of the externally disposed reader/writer (refer to FIG. 11). Further, if the detected value provided by the acceleration sensor 79 is lower than a predetermined value, it can be assumed that the user is not holding the cellular telephone device 1 in his or her hand, or that it is in a state which cannot be said to be a state such that is has approached within a predetermined distance of the externally provided reader/writer device. The CPU 72, when the detected value supplied by the acceleration sensor 79 is at least a predetermined value, does not carry out adjustment of the resonance point of the first usable frequency band (for example 13.56 MHz) by the lumped constant circuit 82, and when less than the predetermined value, adjusts by the lumped constant circuit 82 the high-order secondary resonance point of the first useful band so as to not overlap with the second useful band of the main antenna 70 (for example 800 MHz).

Further, the cellular telephone device 1 of the present embodiment may also be configured such that the timing of the use of the magnetic field antenna 50 is more certainly detected by the cooperative operation of the above-described luminance sensor 78 and the acceleration sensor 79.

For example, when the detected value of the light intensity by the luminance sensor 78 is no more than a predetermined value and the detected value provided by the acceleration sensor 79 is at least a predetermined value (the user holds the cellular telephone device 1 in his or her hand, and it is in a state of approaching within a predetermined distance of an externally provided reader/writer device), the CPU 72 controls so as to not carry out an adjustment of the resonance point of the first usable frequency band (for example 13.56 MHz) by the lumped constant circuit 82. Further, for example, when the detected value of the light intensity by the luminance sensor 78 is larger than a predetermined value, or the detected value provided by the acceleration sensor is lower than a predetermined value (the user is not holding the cellular telephone device 1 in his or her hand, or it is in a state where it has not approached within a predetermined distance of the externally provided reader/writer device), the CPU 72 controls to carry out an adjustment of the resonance point of the first usable frequency band (for example 13.56 MHz) by the lumped constant circuit 82. In this way, the CPU 72 can carry out an adjustment of the resonance point with a higher degree of accuracy taking into consideration the state of use of the user.

Other Embodiment 3

The cellular telephone device 1 can use the RFID portion 41 as a first feature (reader/writer feature), and as a second feature (card feature). The first feature is a feature (reader/writer feature) wherein the cellular telephone device 1 spontaneously transmits data to the outside, and carries out communication with an external device (for example, a card), and the second feature (card feature) is a feature which operates by bringing the cellular telephone device 1 close to an externally provided reader/writer device.

Herein, the operation of the CPU 72 is explained. The CPU 72, when the RFID 41 is used as the first feature, adjusts by the lumped constant circuit 82 (adjustment unit) the resonance point of the first usable frequency band to a first position optimized for the case of use as the first feature. Further, the CPU 72, when the RFID 41 unit is used as the second feature, adjusts by the lumped constant circuit 82 (adjustment unit) the resonance point of the first usable frequency band to a second position optimized for the case of use as the second feature. It should be noted that, in the present embodiment, the CPU 72 adjusts in advance by the lumped constant circuit 82, the resonance point of the first usable frequency band to a first position so that the high-order resonance points of the first usable frequency band do not overlap with a second usable frequency band of the main antenna 70 (the second pathway is selected in the case of the configuration of FIG. 5 and FIG. 6), and when the RFID portion 41 is used as the second feature adjusts the resonance point of the first usable frequency to a second position (the first pathway is selected for the case of the configuration of FIG. 5 and FIG. 6).

Figure 13:
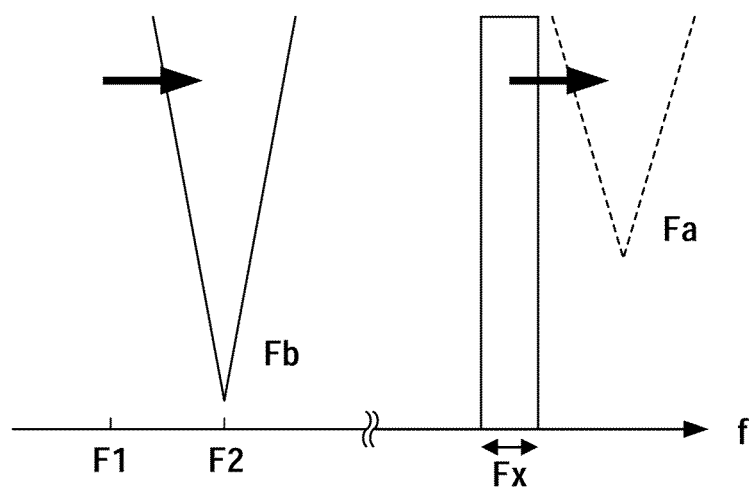
FIG. 13 is a diagram showing the relationship between the usable frequency band of the magnetic field antenna and its high-order resonance points when the RFID portion is used as a reader/writer feature, and the usable frequency band of the main antenna.

Further, as explained above, as a usual setting, the CPU 72 adjusts in advance by the lumped constant circuit 82 the resonance point Fb of a usable frequency band to a first position (the position of F2 in FIG. 13) so that the high-order resonance point Fa of the first usable frequency band does not overlap with the second usable frequency band of the main antenna 70 (the position of Fx in FIG. 13).

Figure 14:
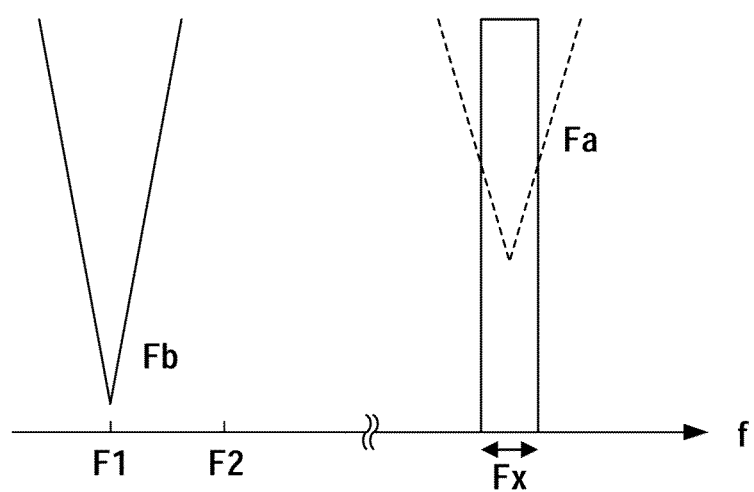
FIG. 14 is a diagram showing the relationship between the usable frequency band of the magnetic field antenna and its high-order resonance points when the RFID portion is used as a card feature, and the usable frequency band of the main antenna.

Further, when the RFID 41 is used as the second feature, the CPU 72 adjusts the resonance point Fb of the first usable frequency band to a second position (the position of F1 in FIG. 14). It should be noted that, in the first feature, because the time of carrying out communication with the external reader/writer device is usually short (for example, 3 seconds), as a timeout condition, it is possible to use a configuration where the resonance point of the first usable frequency band is moved to a first position after the lapse of this communication time.

In this way, in the cellular telephone device 1 of the present embodiment, in usual use, it is possible to overcome the problem of the high-order resonance points of the magnetic field antenna 50 from exerting an effect on the main antenna 70, by adjusting in advance the resonance point of the first usable frequency band to a first position, so that the high-order resonance points of the first usable frequency band do not overlap with the second order frequency band of the main antenna 70.

Next, the motive (trigger) for whether to use the first feature, or whether to use the second feature of the of the RFID portion 41 is explained. The first feature is selected in accordance with a predetermined operation by the user. Further, the second feature, for general use, is utilized when the cellular telephone device 1 is in a closed state.

Accordingly, the CPU 72, with the detection of the predetermined operation by the user as a motive (trigger), adjusts the resonance point of the first usable frequency band to a first position in order to exert the first feature. Further, the CPU 72, in the closed state of the cellular telephone device 1, for example when judging that the level (reception strength) of a signal (carrier) transmitted from an external reader/writer device is higher than a predefined level (defined value), adjusts the resonance point of the first usable frequency band to a second position so that the second feature is exerted. It should be noted that, as explained in the above described <Other Embodiment 1> and <Other Embodiment 2>, the configuration may be one where the RFID portion 41 judges whether the second feature is used by utilizing a luminance sensor 78 or an acceleration sensor 79 or the like.

Other Embodiment 4

As shown in FIG. 3, the cellular telephone device 1 is provided with an open/closed sensor 90 (open/closed detection unit) which detects whether the body is in an opened state or a closed state, and an adjusting unit 91 which carries out adjustment of the resonance point of the first usable frequency band of the magnetic field antenna 50 in response to the detection result of the open/closed sensor 90. For example, the open/closed sensor 90 is built into a predetermined location of the display unit side main body 3, and a magnet is built into a predetermined location of the operating unit side body 2 opposite the open/closed sensor 90 when the cellular telephone device 1 is in a closed state. The open/closed sensor 90, for example, detects the closed state of the cellular telephone device 1 when the magnet is detected, and detects the open state of the cellular telephone device 1 when the magnet cannot be detected. It should be noted that, the open/closed sensor 90 provides the detected result to the adjustment unit 91.

The adjustment unit 91 does not carry out an adjustment of the resonance point of the first usable frequency band of the magnetic field antenna 50 when in the closed state based on the detection by the open/closed sensor 90, and adjusts the resonance point of the first usable frequency band so that the high-order secondary resonance point of the first usable frequency band does not overlap the second usable frequency band of the main antenna 70 when in the open state based on the detection by the open/closed sensor 90. Moreover, in the present embodiment, when the RFID portion 41 is used (in particular, used as the above described card feature), it is assumed that the cellular telephone device 1 is in the closed state.

<First Configuration of the Adjustment Unit 91>

Figure 15:
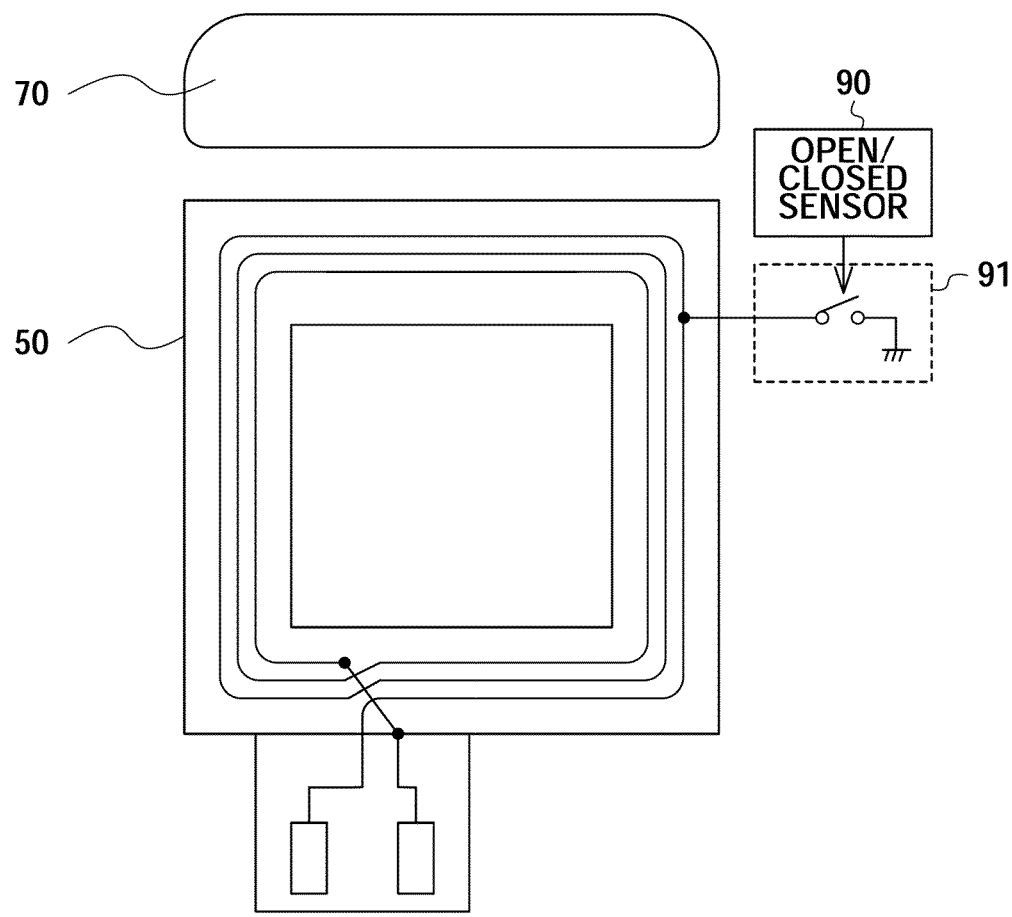
FIG. 15 is a diagram showing the first configuration of the adjusting portion.

Herein the first configuration of the adjustment unit 91 will now be explained. As shown in FIG. 15, the adjustment unit 91, based on the detection (open state) of the open/closed sensor 90, shorts a portion of the magnetic field antenna 50 to GND (reference potential). By this configuration, the present embodiment can greatly move the resonance point of the first usable frequency band of the magnetic field antenna 50, and can greatly move the high-order resonance points of the first usable frequency band, and thus in the open state of the cellular telephone device 1, it is possible to overcome the effects exerted by the high-order resonance points of the magnetic field antenna 50 on the main antenna 70.

<Second Configuration of the Adjustment unit 91>

Figure 16:
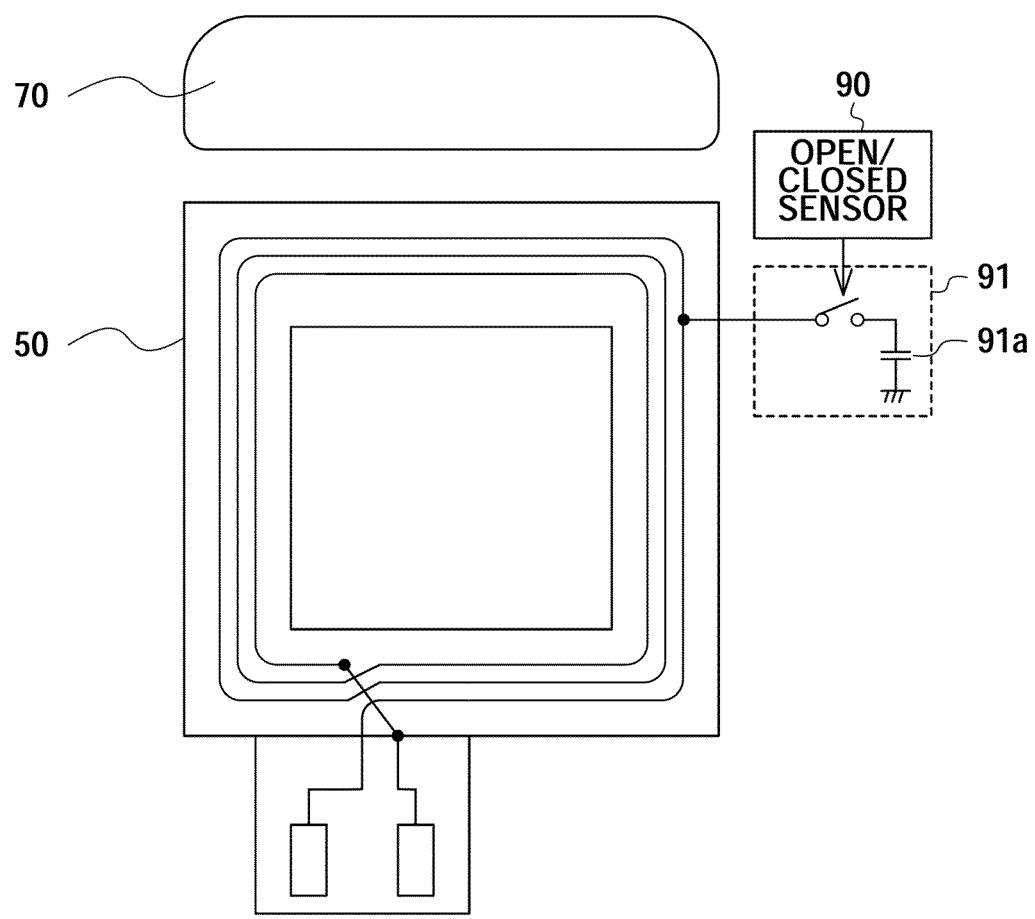
FIG. 16 is a diagram showing the second configuration of the adjusting portion.

Next, the second configuration of the adjustment unit 91 is explained. As shown in FIG. 16, based on the detection result (open state) of the open/closed sensor 90, the adjustment unit 91 shorts a portion of the magnetic field antenna 50 to GND (reference potential) via a capacitor 91a. By this configuration, in the present embodiment, because a direct current does not flow to GND, when a portion of the magnetic field antenna 50 is shorted to GND via a condenser 91a, when a direct current is generated from the RFID portion 41, this direct current does not flow to GND, and the RFID portion 41 can be protected.

Further, in the present embodiment, in the same was as the above described <First Configuration of the Adjustment Unit 91>, the resonance point of the first usable frequency band of the magnetic field antenna 50 can be greatly moved, and the high-order resonance points of the first usable frequency band can be greatly moved, thus in the closed state of the cellular telephone device 1 it is possible to overcome the effect exerted by the high-order resonance points of the magnetic field antenna 50 on the main antenna 70.

<Third Configuration of the Adjustment Unit 91>

Figure 17:
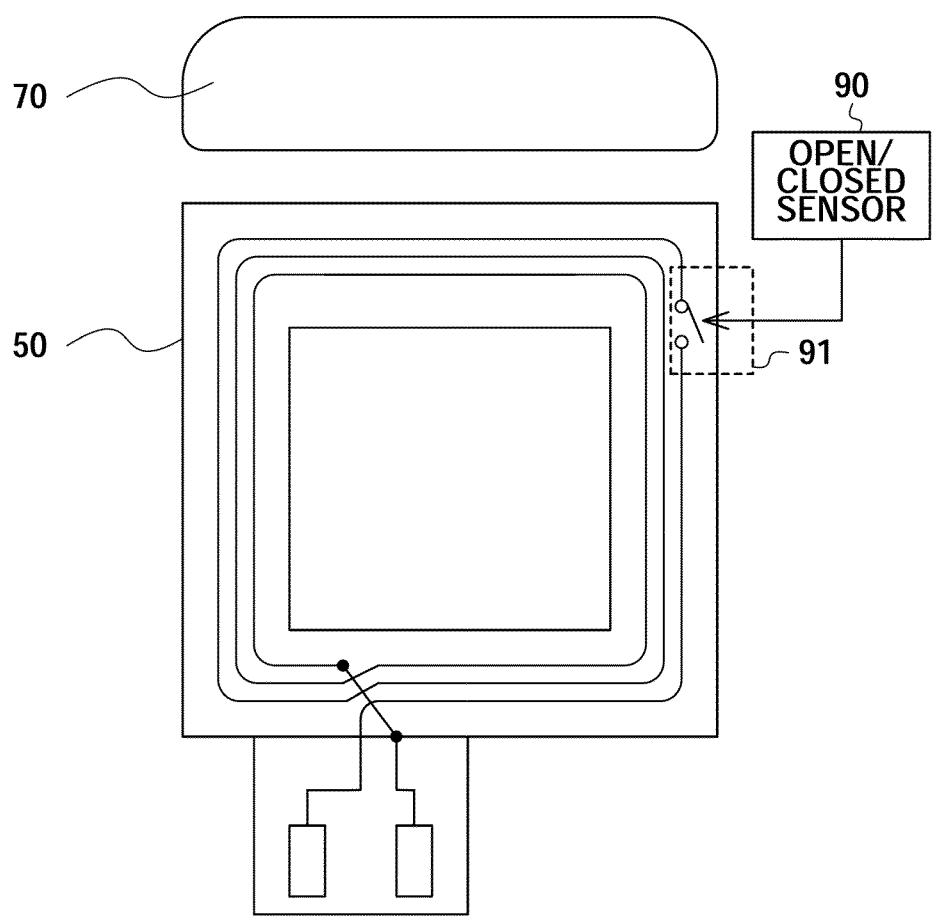
FIG. 17 is a diagram showing the third configuration of the adjusting portion.

Next, the third configuration of the adjustment unit 91 is explained. As shown in FIG. 17, the adjustment unit 91, based on the detection result (open state) of the open/closed sensor 90, puts a loop of a portion of the magnetic field antenna 50 in an open state. By this configuration, in the present embodiment, the resonance points of the magnetic field antenna 50 can be eliminated (in other words, the high-order resonance points of the first usable frequency band do not arise) and thus, in the open state of the cellular telephone device 1, it is possible to overcome the effect of the high-order resonance points of the magnetic field antenna 50 on the main antenna 70.

Further, in the case of utilizing the RFID portion 41 as a reader/writer feature, there may be cases where the cellular telephone device 1 is used in the closed state, but when the reader/writer feature is utilized, a predetermined operation by the user is carried out. Accordingly, the cellular telephone device 1 is controlled so that when a predetermined operation by the user is carried out and the reader/writer feature is utilized, even when in the closed state, an adjustment is not carried out by the adjustment unit 91.

Other Embodiment 5

Further, when carrying out communication by the main antenna 70, when the reception power is sufficiently large, even when the high-order resonance points of the magnetic field antenna 50 overlap with the usable frequency band of the main antenna 70, it is possible that is received almost no effect. The following embodiment is configured based on this assumption.

In the cellular telephone device 1 of the present embodiment, the CPU 72 adjusts by the lumped constant circuit 82 the resonance point of the first usable frequency band so that the high-order secondary resonance point of the first usable frequency band of the magnetic field antenna 50 does not overlap the second usable frequency band when the reception strength (power) of the second usable frequency band by the main antenna 70 is no more than a predetermined value (threshold A). Further, the CPU 72 does not adjust the resonance point of the first usable frequency band by the constant lumped circuit 82 when the reception strength (power) of the second usable frequency band by the main antenna 70 is higher than a predetermined value (threshold A).

Figure 18:
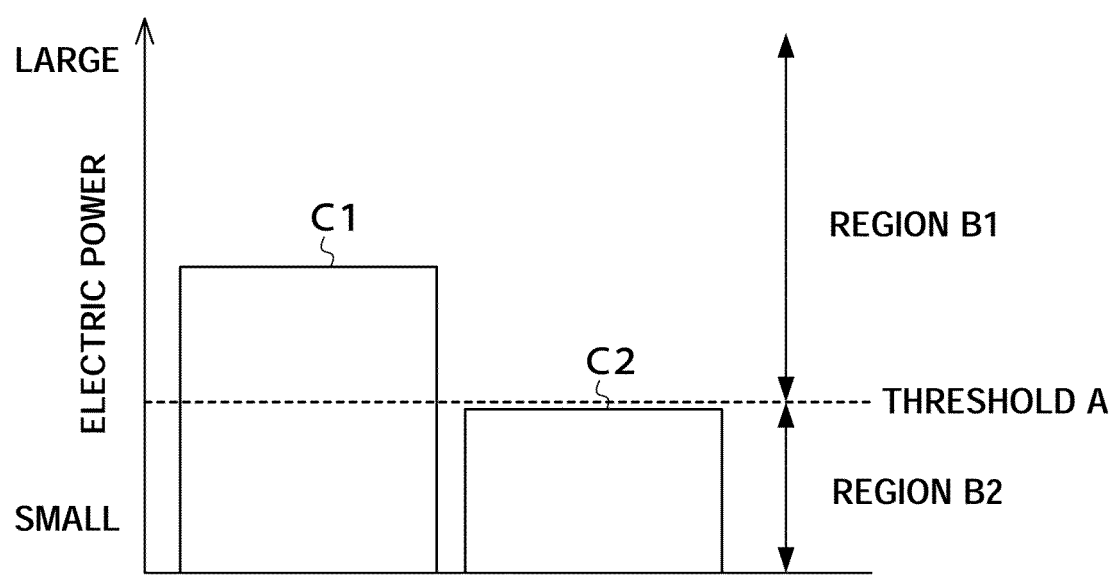
FIG. 18 is a diagram providing an explanation of whether or not the usable bandwidth of the magnetic field antenna is adjusted, based on the reception strength of the main antenna.

Further, the predetermined value (threshold A) of the reception strength of the second usable frequency band, as shown in FIG. 18, is set in the vicinity of the boundary of the region (region B1 in FIG. 18) where it can be considered that the reception power of the main antenna 70 is sufficiently large and received almost no effect from the high-order resonance points of the magnetic field antenna 50, and the region (region B2 in FIG. 18) where it can be considered that the reception power of the main antenna 70 is small and can receive an effect of the high-order resonance points of the magnetic field antenna 50.

According to this configuration, when the reception power of the main antenna 70 is greater than the threshold A (C1 in FIG. 18), because it can be considered that almost no effect is received from the high-order resonance points of the magnetic field antenna 50, the usable frequency band of the magnetic field antenna 50 is not moved and thus, in addition to carrying out favorable communication by the main antenna 70, it is also possible to achieve a state where communication can also be favorable carried out by the magnetic field antenna 50. Further, when the reception strength of the main antenna 70 is below the threshold A (region C2 in FIG. 18), it can be considered that it is possible that effect is received from the high-order resonance points of the magnetic field antenna 50, and thus by moving the usable frequency band of the magnetic field antenna 50, it is possible to carry out excellent communication by the main antenna 70.

Further, the present embodiment may also have a configuration where the extent of characteristic degradation when an adverse effect from the high-order resonance points of the magnetic field antenna 50 is received by the main antenna 70 can be recorded as being classified in various grades, and tabulated with reference to the reception power of the main antenna 70, and the adjustment amount of the usable frequency band of the main antenna 50 can be decided with reference to said table based on the actual reception power of the main antenna 70. In the case of such a configuration, a plurality of thresholds A can be set, and further when the configuration shown in FIG. 5 is applied, the lumped constant circuit 82 may be configured in a plurality of stages such that a plurality of pathways can be selected, and further, as shown in FIG. 6, in the case that such a configuration is applied, a plurality of element lengths of the magnetic field antenna 50 can be selected.

Other Embodiment 6

To the contrary, when the reception power of the main antenna 70 is sufficiently large, or when the CPU 72 judges that modulation/demodulation processing has occurred by the communication processing unit 71, it can be assumed that the probability of using the magnetic field antenna 50 is low. Thus, in this case, the CPU 72 controls so as to adjust by the lumped constant circuit 82 the resonance point of the first usable frequency band so that the high-order resonance points of the magnetic field antenna 50 do not overlap with the second usable frequency band of the main antenna 70.

On the other hand, when the reception power of the main antenna 70 is low, or it is judged that a modulation/demodulation process is not carried out by the communication processing unit 71, it can be assumed that the probability of using the main antenna 70 is low. Thus, in this case, the CPU 72 does not adjust the resonance point of the magnetic field antenna 50, or suppresses the adjustment.

By such a configuration, in the present embodiment, when the probability of using the magnetic field antenna 50 is low, gain reduction of the main antenna 70 can be suppressed because the high-order resonances of the magnetic field antenna 50 do not overlap with the second usable frequency band by the main antenna 70. Further, in the present embodiment, when there is a low probability of using the main antenna 70, gain reduction of the magnetic field antenna 50 can be suppressed because the resonance point of the magnetic field antenna 50 is not adjusted.

Other Embodiment 7

Further, in the various above embodiments, an explanation was given for switching the L value of the magnetic field antenna 50 under predefined conditions in order to prevent the phenomenon of the high-order resonance points of the magnetic field antenna 50 from exerting an effect on the usable frequency band of the main antenna 70, but when the timing for this switching is closely considered, it is possible that there will be circumstances wherein it is difficult to specify the use conditions of the RFID 41.

Further, when the timing of this switching is inappropriate, it is expected that degradation of the communication feature by the RFID portion 41, and degradation of the performance of the communication feature by the main antenna 70 will arise. Further, when the circuit to switch the L value of the magnetic field antenna 50 is meaninglessly operated, the current consumption of the cellular telephone device 1 is increased, and further, it is possible that there will be cases wherein the use time of the communication feature by the RFID portion 41 or the communication feature by the main antenna 70 will be reduced. Accordingly, it is necessary to consider how to assure that such cases do not arise.

The cellular telephone device 1, in order to reduce electric current consumption, intermittently carries out an operation for confirming whether or not communication is carried out with an external device using the communication feature of the main antenna 70 (below referred to as the standby reception operation). In the present embodiment, control is carried out such that, during the intermittently performed standby reception operation, communication by the main antenna 70 is prioritized, and when the standby reception operation is not performed, communication by the RFID portion 41 is prioritized.

Herein, the standby reception operation will be explained. In the present embodiment, the second communication unit 61 adopts the CDMA (Code Division Multiple Access) communication method. In communication by CDMA, the cellular telephone device 1 receives an assignment of an intermittent communication interval from a base station when in a stable reception state. Further, a slot cycle index (SCI) intermittent period, can be for example, 1.28 sec, 2.56 sec, 5.12 sec or the like, and any one intermittent period can be set by the base station. It should be noted that, the above description is explained for the case of adopting the CDMA in the present embodiment, but it is not limited to CDMA, and other wireless communication methods may also be adopted.

Next, a reduction of the electric current consumption in the standby reception operation of the cellular telephone device 1 is explained. In the cellular telephone device 1, synchronous reception can be carried out with the base station on startup, and further, once stabilized and in a state wherein a message can be received from the base station, an agreement is made to send a paging message at a predefined cyclic interval. The cellular telephone device 1 is not carrying out a reception operation in the period when this paging message is not sent, and thus when this reception operation is not carried out, it is controlled so that the provision of electric current to the reception circuit of the second communication unit 61 is stopped. Further, the cellular telephone device 1 is controlled such that electric current is provided to the reception circuit of the second communication unit 61 only when the paging message is sent. In this way, the cellular telephone device 1 can reduce electric current consumption in a standby reception operation because the second communication unit 61 carries out startup of the reception circuit at determined intermittent reception intervals.

In the cellular telephone device 1 of the present embodiment, the usable frequency band of the magnetic field antenna 50 is adjusted only during the sending of the paging message, so that the high-order resonance points of the magnetic field antenna 50 do not span the usable frequency band of the main antenna 70, and at other times, adjustment of the usable frequency band of the magnetic field antenna 50 is not carried out.

Herein the operation of the CPU 72 will be explained. When the main antenna 70 carries out communication operations with an external device (for example, a base station), the CPU 72 adjusts by the lumped constant circuit 82 the resonance point of the first usable frequency band so that the high-order secondary resonance point of the usable frequency band of the magnetic field antenna 50 does not overlap with the second usable frequency band of the main antenna 70, and further, when the main antenna 70 is not carrying out a communication operation with an external device, does not carry out an adjustment of the resonance point of the first useful frequency band by the lumped constant circuit 82.

By means of the configuration, in the present embodiment, it eliminates cases where an increase in the electric current consumption of the cellular telephone device 1 and where the use time of the communication feature by the RFID unit 41 or the communication time by the main antenna 70 is shortened, and it is possible to prevent the high-order resonance points of the magnetic field antenna 50 from exerting an effect on the main antenna 70.

Specifically, when the intermittent reception operation is carried out, the CPU 72 prioritizes the performance of the main antenna 70 and thus adjusts the L value of the magnetic field antenna 50 of the RFID portion 41 and carries out control such that the high-order resonance points of the magnetic field antenna 50 do not exert an effect on the main antenna 70. Further, when intermittent reception operation is do not carried out, because it is unnecessary to consider the effect on the main antenna 70, the CPU 72 carries out control so as to not adjust the L value so that the magnetic field antenna 50 of the RFID portion 41 is in an optimal state.

Further, in the case of a configuration wherein the L value of the magnetic field antenna 50 is switched depending on the presence or absence of operating current, when the main antenna 70 is prioritized (namely, when a paging message is intermittently transmitted), operating current is provided and the L value of the magnetic field antenna 50 is switched. In this way, the cellular telephone device 1 can prevent an increase in the consumed electric current during intermittent reception.

The invention claimed is:

1. A portable wireless device comprising:
    a body;
    a first communication unit arranged in the body and including a first antenna unit that communicates with an external device by way of a first usable frequency band, and a first information processing unit that performs predetermined processing with respect to information communicated by the first antenna unit;
    a second communication unit arranged in the body and including a second antenna unit that is disposed in the vicinity of the first antenna unit and communicates by way of a second usable frequency band that is a frequency band overlapping a high-order secondary resonance point of the first usable frequency band, and a second information processing unit that performs predetermined processing with respect to information communicated by the second antenna unit;

an adjustment unit which adjusts a resonance point of the first usable frequency band of the first antenna unit; and a control unit which adjusts by the adjustment unit the resonance point of the first usable frequency band so that a high-order secondary resonance point of the first usable frequency band does not overlap with the second usable frequency band, wherein the first antenna is a loop antenna comprising a wiring pattern, the adjustment unit is added to the wiring pattern of the loop antenna, and the control unit adjusts the resonance point of the first usable frequency band by switching a first pathway in which the adjustment unit is connected to the wiring pattern and a second pathway in which the adjustment unit is not connected to the wiring pattern.

2. The portable wireless device according to claim 1, wherein the control unit, when a reception strength of the first usable frequency band by the first antenna unit is no more than a predetermined value, adjusts by the adjustment unit the resonance point of the first usable frequency band so that the high-order secondary resonance point of the first usable frequency band does not overlap with the second usable frequency band.

3. The portable wireless device according to claim 1, wherein the control unit judges whether or not there is a demand for the predetermined processing by the first information processing unit of the first communication unit, and when it has judged that there is no such demand, adjusts by the adjustment unit the resonance point of the first usable frequency band so that the high-order secondary resonance point of the first usable frequency band does not overlap with the second usable frequency band.

4. The portable wireless device according to claim 1, wherein the control unit, when a reception strength of the second usable frequency band by the second antenna unit is at least a predetermined value, adjusts by the adjustment unit the resonance point of the first usable frequency band so that the high-order secondary resonance point of the first usable frequency band does not overlap with the second usable frequency band.

5. The portable wireless device according to claim 1, wherein the control unit judges whether or not there is a demand for the predetermined processing by the second information processing unit of the second communication unit, and when it has judged that there is such a demand, adjusts by the adjustment unit the resonance point of the first usable frequency band so that the high-order secondary resonance point of the first usable frequency band does not overlap with the second usable frequency band.

6. The portable wireless device according to claim 1, further comprising:

a light intensity detection unit which detects light intensity outside of the body, wherein the control unit, when a detected value of the light intensity by the light intensity detection unit is higher than a predetermined value, adjusts the resonance point of the first usable frequency band by the adjustment unit.

7. The portable wireless device according to claim 1, further comprising:

an acceleration sensor, which is built into the body, and which detects acceleration of the body, wherein the control unit, when a detected value by the acceleration sensor is at least a predetermined value, adjusts the resonance point of the first usable frequency band by the adjustment unit.

8. The portable wireless device according to claim 1, further comprising:

an open/closed detection unit which detects whether the body is in an open state or a closed state, wherein the control unit, when an open state is detected by the open/closed detection unit, adjusts by the adjustment unit the resonance point of the first usable frequency band so that the high-order secondary resonance point of the first usable frequency band does not overlap with the second usable frequency band.

9. The portable wireless device according to claim 1, wherein the control unit, when the second antenna unit is carrying out a reception operation with an external device, adjusts by the adjustment unit the resonance point of the first usable frequency band so that the high-order secondary resonance point of the first usable frequency band does not overlap with the second usable frequency band.

10. The portable wireless device according to claim 1, wherein the adjustment unit adjusts the resonance point of the first antenna unit within a range of the first usable frequency band.

11. The portable wireless device according to claim 1, wherein the control unit suppresses the adjustment until after the elapse of a predetermined time from the start of the adjustment of the resonance point of the first usable frequency band by the adjustment unit.

* * * * *